US006487876B2

(12) United States Patent
Howard et al.

(10) Patent No.: US 6,487,876 B2
(45) Date of Patent: Dec. 3, 2002

(54) METHOD FOR PROVIDING REFRIGERATION TO PARALLEL HEAT EXCHANGERS (75) Inventors: Lee Jarvis Howard, Boyertown, PA (US); Howard Charles Rowles, Center Valley, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/801,387

(22) Filed: Mar. 8, 2001

(65) Prior Publication Data

US 2002/0124595 A1 Sep. 12, 2002

(51) Int. Cl.[7] .................................................. F25J 3/00
(52) U.S. Cl. ....................................................... 62/622
(58) Field of Search ........................... 62/932, 903, 622

(56) References Cited

U.S. PATENT DOCUMENTS

| | | | |
|---|---|---|---|
| 3,625,017 A | 12/1971 | Hoffman | 62/26 |
| 4,002,042 A | 1/1977 | Pryor et al. | 62/28 |
| 4,451,275 A | 5/1984 | Vines et al. | 62/28 |
| 4,479,871 A | 10/1984 | Pahade et al. | 208/340 |
| 4,629,484 A | 12/1986 | Kister | 62/29 |
| 4,718,927 A | 1/1988 | Bauer et al. | 62/39 |
| 4,746,342 A | 5/1988 | DeLong et al. | 62/24 |
| 4,758,258 A | 7/1988 | Mitchell et al. | 62/25 |
| 4,900,347 A | 2/1990 | McCue, Jr. et al. | 62/24 |
| 4,948,405 A | 8/1990 | Thompson | 62/24 |
| 5,035,732 A | 7/1991 | McCue, Jr. | 62/24 |
| 5,253,479 A | 10/1993 | Di Cintio et al. | 62/24 |
| 5,377,490 A | 1/1995 | Howard et al. | 62/236 |
| 5,379,597 A | 1/1995 | Howard et al. | 62/23 |

*Primary Examiner*—William C. Doerrler
*Assistant Examiner*—Malik N. Drake
(74) *Attorney, Agent, or Firm*—John M. Fernbacher (57) ABSTRACT

A method for cooling a process stream in which one of a plurality of open-loop refrigerant streams is cooled by indirect heat exchange with other of the open-loop refrigerant stream in a refrigerant heat exchanger to yield a cooled primary refrigerant stream. The process stream is cooled by indirect heat exchange with a process refrigerant stream in a separate process heat exchanger, wherein the process refrigerant stream comprises at least a portion of the cooled primary refrigerant stream. The method is particularly useful in large process plants which require multiple parallel heat exchangers to cool the process stream.

21 Claims, 3 Drawing Sheets

METHOD FOR PROVIDING REFRIGERATION TO PARALLEL HEAT EXCHANGERS

BACKGROUND OF THE INVENTION

The separation of low-boiling gas mixtures requires refrigeration to cool and condense feed streams which are separated into desired product fractions. Refrigeration typically is provided to a warm feed stream by indirect heat exchange with cold process streams from other locations within a process plant, and also can be provided by closed-loop or recirculating refrigerant systems. Refrigeration also can be generated by work expansion of the feed stream itself, portions of the feed stream, or other process streams.

Refrigeration is provided by these methods for the separation of feed gas mixtures contain light gases such as hydrogen, nitrogen, carbon monoxide, and carbon dioxide as well as light hydrocarbons containing one or more carbon atoms. Typical applications include nitrogen rejection from nitrogen-light hydrocarbon mixtures and ethylene or propylene recovery from cracked gases produced by hydrocarbon pyrolysis.

The cooling and condensing of a feed gas in these applications typically involves at least one multiple-stream conventional heat exchanger or dephlegmator in which refrigeration is provided by three or more cold process streams and possibly by dedicated refrigerant streams. This requires a complex heat exchanger with significant piping and manifolding for the introduction and withdrawal of the numerous warmed and cooled steams. In many cases, the flow rate of the feed gas stream exceeds the capacity of a single heat exchanger, and multiple parallel heat exchangers must be used. This further complicates the required piping and manifolding.

In process situations which require such a plurality of large, multiple-stream heat exchangers, it is desirable to simplify the required piping and manifolding in order to reduce capital cost and operating complexity. The invention described below and defined in the claims which follow addresses this need with a simplified method and system for cooling process stream with multiple refrigerant streams.

BRIEF SUMMARY OF THE INVENTION

The invention is a method for cooling a process stream which comprises obtaining a plurality of open-loop refrigerant streams, selecting one of the open-loop refrigerant streams as a primary refrigerant stream, and cooling the primary refrigerant stream by indirect heat exchange with other of the open-loop refrigerant streams in a refrigerant heat exchanger to yield a cooled primary refrigerant stream. The process stream is cooled by indirect heat exchange with a process refrigerant stream in a process heat exchanger to yield one or more cooled process streams and a warmed process refrigerant stream, wherein the process refrigerant stream comprises at least a portion of the cooled primary refrigerant stream.

The method can further comprise operating one or more additional process heat exchangers in parallel with the process heat exchanger wherein each of the additional process heat exchangers cools an additional process stream by indirect heat exchange with a portion of the process refrigerant stream. The process stream and the additional process streams typically are gas mixtures which have identical compositions.

The process heat exchanger can be a dephlegmator heat exchanger which cools, partially condenses, and rectifies a mixed feed gas stream to produce a condensate stream and a light overhead gas stream. Alternatively, the process heat exchanger can be a conventional heat exchanger.

The warmed process refrigerant stream optionally can be work expanded to yield an expanded cooled refrigerant stream which provides one of the other open-loop refrigerant stream. The expanded cooled refrigerant stream optionally can be warmed to provide refrigeration in the refrigerant heat exchanger, a warmed expanded refrigerant stream can be with drawn therefrom, and the warmed expanded refrigerant stream can be further work expanded to yield a further expanded cooled refrigerant stream which provides another of the other open-loop refrigerant streams.

A portion of the light overhead gas stream can be combined with the cooled primary refrigerant to provide the process refrigerant stream. The warmed process refrigerant stream an be work expanded to yield an expanded cooled refrigerant stream which can provide one of the other open-loop refrigerant streams.

The expanded cooled refrigerant stream can be warmed to provide refrigeration in the refrigerant heat exchanger, a warmed expanded refrigerant stream can be withdrawn therefrom, and the warmed expanded refrigerant stream can be further work expanded to yield a further expanded cooled refrigerant stream which provides another of the other open-loop refrigerant streams.

The cooled primary refrigerant stream can be a two-phase vapor-liquid primary refrigerant stream. In this embodiment, the method further comprises (1) separating the two-phase vapor-liquid primary refrigerant stream into a vapor refrigerant stream and a liquid refrigerant stream;

(2) combining the vapor refrigerant stream with a portion of the light overhead gas stream to yield a combined vapor refrigerant;

(3) warming the combined vapor refrigerant in the refrigerant heat exchanger to provide refrigeration therein and yield a warmed combined vapor refrigerant;

(4) work expanding the warmed combined vapor refrigerant to provide a cooled combined refrigerant; and (5) combining the cooled combined refrigerant with the liquid refrigerant stream of (1) to provide the process refrigerant stream.

The method can further comprise withdrawing the warmed process refrigerant stream from the process heat exchanger and work expanding the warmed process refrigerant to provide one of the other open-loop refrigerant streams.

The process stream cooled by the method of the present invention can comprise hydrogen, methane, ethylene, and ethane. Alternatively, the process stream can comprise nitrogen, ethane, and ethane. In another alternative, the process stream can comprise hydrogen carbon monoxide, and methane.

The light overhead gas stream can comprise hydrogen and methane. In this embodiment, the method can further comprise separating a portion of the light overhead gas stream into a hydrogen-enriched product stream and a methane-enriched fuel stream, and utilizing the hydrogen-enriched product stream and the methane-enriched fuel stream to provide two of the other open-loop refrigerant streams.

If desired, two of the plurality of open-loop refrigerant streams can be combined to provide the primary refrigerant stream which is cooled by indirect heat exchange with the other open-loop refrigerant streams.

Additional refrigeration, if required, can be provided to either or both of the refrigerant heat exchanger and the process heat exchanger by warming a refrigerant provided by a closed-loop refrigeration system.

The invention also includes a heat exchanger system for cooling a process stream which comprises:

(a) refrigerant heat exchange means for providing indirect heat exchange among a plurality of open-loop refrigerant streams whereby one of the open-loop refrigerant streams is cooled by indirect heat exchange with other of the open-loop refrigerant streams to yield a cooled primary refrigerant stream and warmed refrigerant streams;

(b) process heat exchange means for providing indirect heat exchange between at the process stream and a process refrigerant stream to yield a cooled process stream and an additional warmed refrigerant stream, wherein the process refrigerant stream comprises at least a portion of the cooled primary refrigerant stream.

(c) piping means for introducing the open-loop refrigerant streams into the refrigerant heat exchange means and for withdrawing the cooled primary refrigerant stream and warmed refrigerant streams from the refrigerant heat exchange means; and (d) piping means for introducing the process refrigerant stream into the process heat exchange means and for withdrawing the cooled process stream and the warmed process refrigerant stream from the process heat exchange means.

DETAILED DESCRIPTION OF THE INVENTION

The present invention offers a simplified method and system for cooling a process stream wit multiple refrigerant streams which is especially useful when the process stream ha a high flow rate which requires the use of multiple parallel process heat exchangers.

Figure 1:
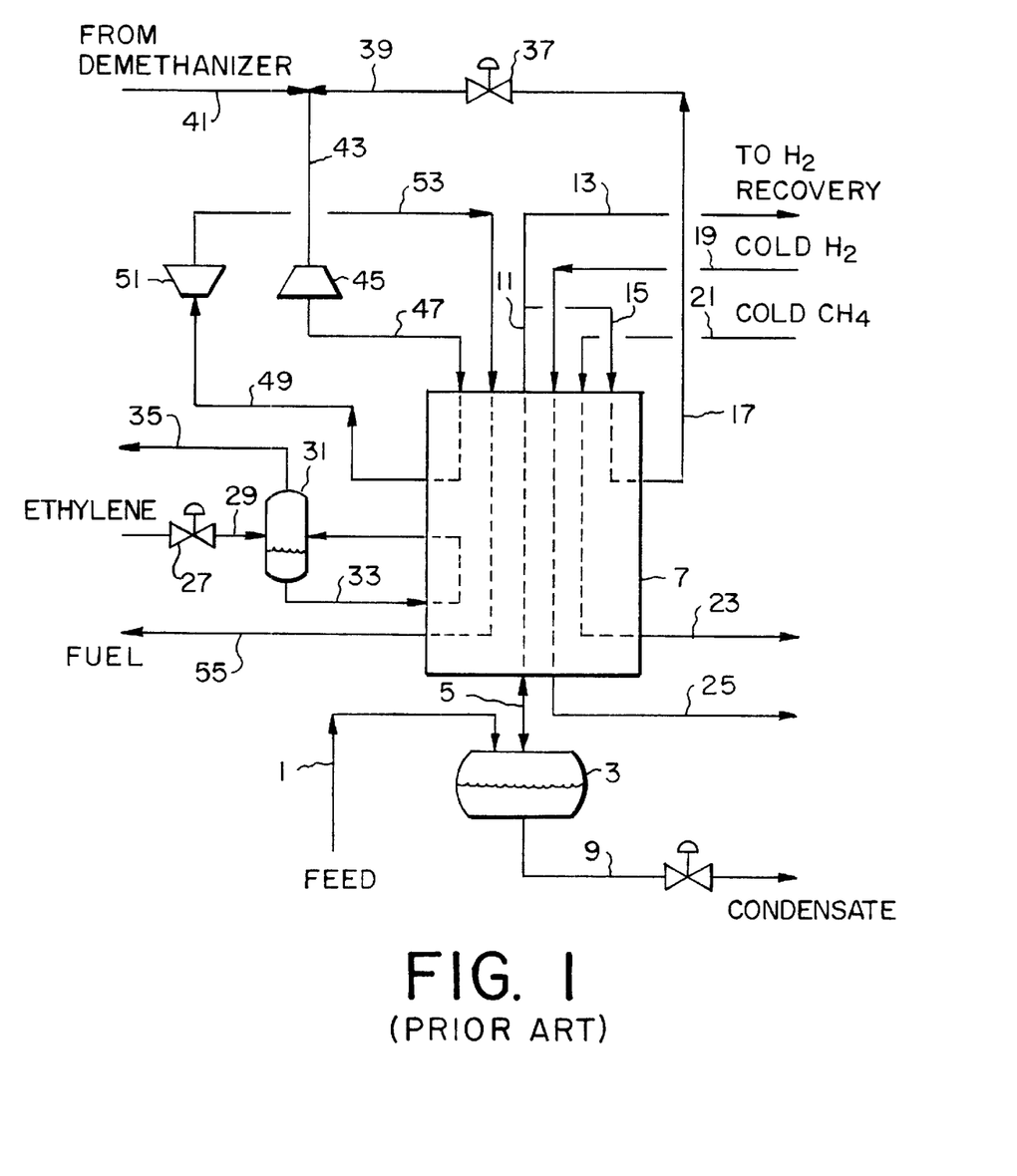
FIG. 1 is a schematic flow diagram of a multiple-stream dephlegmator heat exchanger as used in the prior art.

A typical heat exchange system for cooling a process stream by multiple refrigerant streams using prior art methods is illustrated in FIG. 1. Feed gas stream 1, which for the purposes of this illustration is cracked gas from a hydrocarbon pyrolysis process, contains primarily hydrogen, methane, ethane, and ethylene. This feed gas is processed to recover an ethylene-rich stream for further purification. In this illustration, as in many ethylene plants, dephlegmators are utilized for cooling and prefractionation (rectification) of the cracked gas feed; multiple, parallel dephlegmators are required, each of which utilizes multiple refrigerant streams.

Feed gas 1 introduced into dephlegmator drum 3, and uncondensed vapor flows upward through line 5 and into one group of flow channels in dephlegmator heat exchanger 7, where n the vapor is partially condensed and rectified. Condensate flows downward in these channels in mass and heat exchange with the upward-flowing vapor, thereby enriching the liquid in the heavier components and enriching the vapor in the lighter components. Condensate flows downward through line 5 into drum 3 and is withdrawn via line 9 as liquid condensate enriched in ethylene. This ethylene-rich condensate can be separated further by distillation in one or more demethanizer columns (not shown to yield a purified ethylene product.

Vapor enriched in hydrogen and methane is withdrawn through line 11 and is divided into two streams via lines 13 and 15. The first portion via line 13 is sent to a hydrogen recovery stem (not shown) and the second portion via line 15 is returned to dephlegmator heat changer 7, warmed therein to provide refrigeration, and withdrawn via line 17. Cold purified hydrogen and cold recovered methane are returned via lines 19 and 21 respectively from the hydrogen recovery system and flow through separate groups of flow channels in dephlegmator heat exchanger 7 to provide additional refrigeration therein. Warmed hydrogen and methane streams are withdrawn via lines 25 and 23 respectively.

Additional refrigeration is provided by cold ethylene refrigerant which is flashed across valve 27 and introduced via line 29 into separator 31. Cold liquid passes via line 33 into another group of flow channels in dephlegmator heat exchanger 7 to provide additional refrigeration therein. Vaporized ethylene is returned via line 35 to a refrigeration compression and condensation system (not shown) in a closed-loop arrangement.

Warmed vapor in line 17 is reduced in pressure across valve 37 and the reduced-pressure stream in line 39 is combined with cold overhead gas via line 41 from the demethanizer column(s) to yield a combined cold stream in line 43. Cold stream 43 is work expanded in turboexpander 45 to provide a further cooled stream in line 47, which flows through dephlegmator heat exchanger 7 to provide additional refrigeration therein. A warmed stream is withdrawn via line 49 and further work expanded in turboexpander 51, and the cooled Expanded stream returns via line 53 to dephlegmator heat exchanger 7 and provides additional refrigeration therein. Final warmed vapor is withdrawn through line 55 for fuel or other uses.

A typical word-scale ethylene plant utilizing this method to condense feed gas could require 4 to 8 dephlegmators in parallel to process the large feed gas flow and to accommodate the multiple refrigerant streams. The piping and manifolding associated with these multiple refrigerant streams and multiple, parallel dephlegmators would be large, complex, and expensive.

In the present invention, refrigeration is provided in a simplified manner from multiple refrigerant streams to multiple, parallel conventional heat exchangers or dephlegmators. Refrigeration first is transferred to one of the refrigerant streams, defined as the primary refrigerant stream, by cooling and at least partially condensing that stream in a separate refrigerant heat exchanger by indirect heat exchange with the remaining refrigerant streams. The resulting cooled primary refrigerant stream, either alone or combined with other refrigerant stream(s), provides a stream defined as a process refrigerant stream which cools one or more process streams by indirect heat exchange in the parallel conventional heat exchangers or dephlegmators. The primary refrigerant stream preferably is a stream which is close to its dew point and can be easily condensed, and the is capable of absorbing the maximum amount of refrigeration to be transferred from the other refrigerant streams over the warmest range of temperature.

In the present invention, a dephlegmator or dephlegmator heat exchanger is defined as a device in which simultaneous heat and mass transfer occurs such that rectification of at least one of the streams is realized. This is described in more detail below. In contrast to a dephlegmator or dephlegmator heat exchanger, a conventional heat exchanger is defined as a heat exchanger in which indirect heat exchange occurs between streams but no rectification occurs in any stream. Phase change, i.e., condensation or vaporization, can occur in a conventional heat exchanger. A refrigerant heat exchanger as Described herein is a conventional heat exchanger. The generic term process heat exchanger includes both dephlegmator heat exchangers and conventional heat exchangers.

In some applications, it may be necessary or desirable to combine the primary refrigerant stream with an additional refrigerant stream, either before or after the primary refrigerant stream is cooled, if the primary refrigerant stream alone cannot provide all of the required refrigeration to cool the process stream or streams. This combined refrigerant stream can be utilized as the process refrigeration stream to provide refrigeration directly to the multiple, parallel process heat exchangers.

When a primary refrigerant stream is a relatively heavy, high-boiling stream, it can be condensed over a warm temperature range and combined with a lighter, lower boiling refrigerant stream to lower the temperature range over which the heavy, high boiling components in the mixture can be vaporized.

Figure 2:
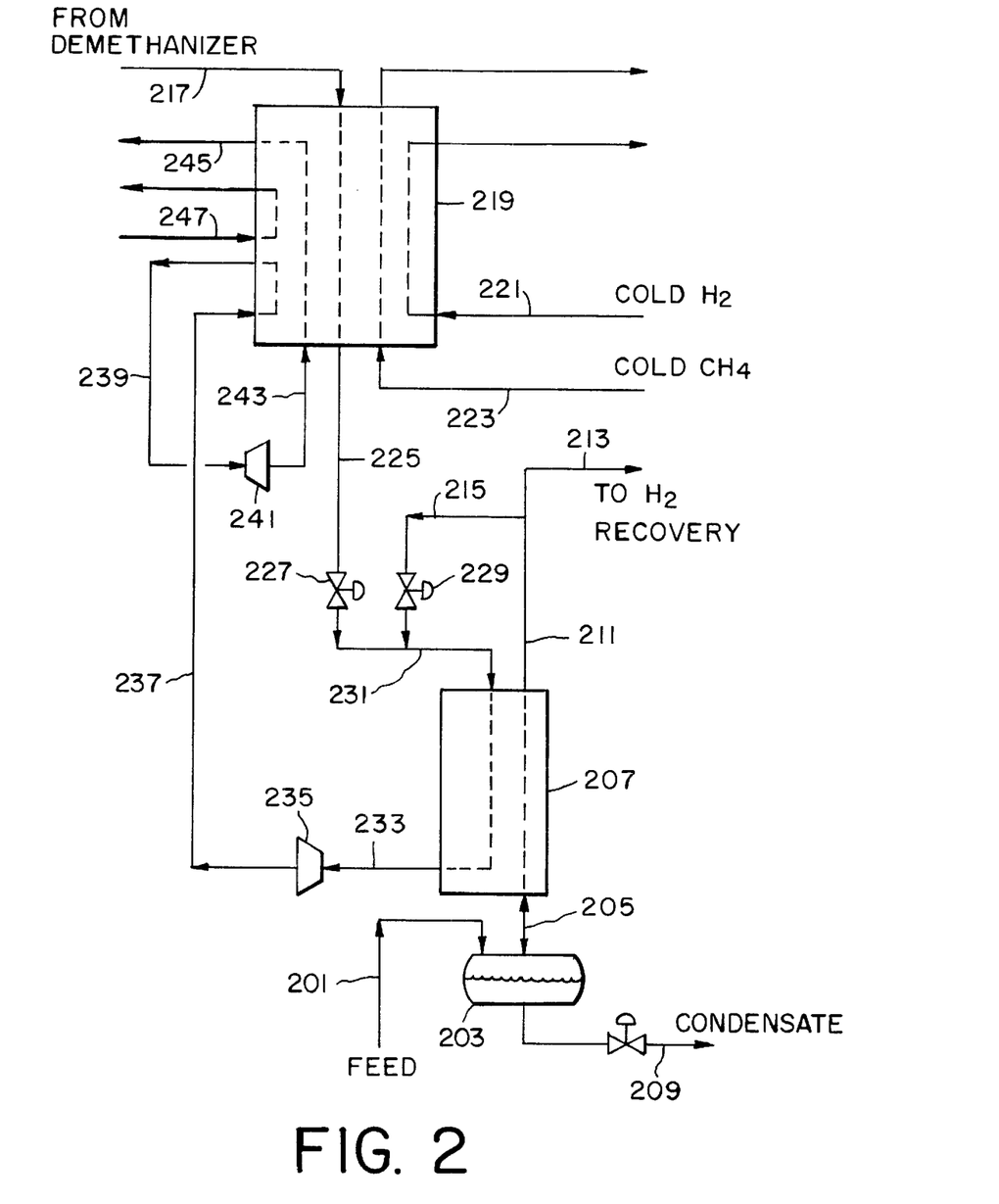
FIG. 2 is schematic flow diagram of a dephlegmator heat exchanger system according to on t of the present invention.

An embodiment of the present invention is illustrated in FIG. 2 for condensing and prefractionating the cracked gas from a hydrocarbon polyrolysis process as above. Feed gas 201 is introduced into dephlegmator drum 203 and uncondensed vapor flows upward through line 205 and into one or more groups of flow channels in dephlegmator heat exchanger 207, wherein the vapor is partially condensed. Rectification occurs in dephlegmator heat exchanger 207 wherein condensate flows downward in mass and heat exchange with the upward-flowing vapor, thereby enriching the liquid in the heavier components and enriching the vapor in the lighter components. Condensate flows downward through line 205 into drum 203 and is withdrawn via line 209 as a liquid condensate enriched in ethylene. This ethylene-rich condensate is further separated by distillation in one or more demethanizer columns (not shown) to yield a purified ethylene product.

Cold vapor enriched in hydrogen and methane is withdrawn through line 211 and divided into two streams via lines 213 and 215. The first portion via line 213 is sent to a hydrogen recovery system (not shown). Overhead gas from the demethanizer columns(s) via line 217 is cooled in refrigerant heat exchanger 219 at least in part by indirect heat exchange with cold hydrogen and methane streams in lines 221 and 223 respectively from the hydrogen recovery system (not shown). Cooled demethanizer column overhead in line 225 passes through pressure control valve 227, and optionally is combined with cold hydrogen-enriched vapor from line 215 after flow control valve 229. The combined process refrigerant stream in line 231 provides refrigeration to dephlegmator heat exchanger 207 for cooling and condensing the feed vapor entering via line 205. In this process description, stream 217 is the primary refrigerant and stream 231 is the process refrigerant stream.

Dephlegmator heat exchanger 207 typically is a brazed core-type plate and fin heat exchanger fabricated of aluminum or stainless steel. This type of heat exchanger, which is well-known in the art, contains a plurality of flow passages or channels arranged in groups, each group of which operates in heat transfer or heat and mass transfer service for an individual process stream. Each group of flow passages or channels is in indirect heat exchange relation with other groups of passages or channels, and heating and cooling of multiple process streams occurs by indirect heat transfer among the groups of passages or channels. Each group of passages or channels is isolated from the others with respect to fluid flow, and vapor-liquid mass transfer can occur for a given process stream within a given group of passages or channels. In some flow passages or channels, phase change may or may not occur, while in others phase change will occur. Phase change can occur in a flow passage or channel in which both phases flow concurrently, and a stream can be totally or partially condensed or vaporized therein. Alternatively, phase change can occur in a flow passage or channel in which vapor and liquid flow countercurrently such that rectification or vapor-liquid mass transfer occurs. Upward-flowing vapor is enriched in the more volatile components in the stream while the downward-flowing liquid is enriched in the less volatile components in the stream. A dephlegmator typically provides the equivalent of 5 to 15 theoretical equilibrium stages of separation or rectification.

In the present disclosure, the terms rectify or rectification mean the separation of a mixture by vapor-liquid phase change with accompanying vapor-liquid mass transfer and heat transfer over a continuous range of temperatures. Individual stages containing mass transfer devices typically are not used, and mass transfer preferably occurs during rectification with continuous vapor-liquid contact.

Referring again to FIG. 2, warmed refrigerant is withdrawn from dephlegmator heat exchanger 207 via line 233 and is work expanded in turboexpander 235 to yield a cooled expanded refrigerant in line 237, which is passed through refrigerant heat exchanger 219 to provide a portion of the refrigeration to cool demethanizer column overhead 217. Warmed refrigerant is withdrawn therefrom via line 239 and further work expanded through turboexpander 241. The resulting cooled expanded refrigerant in line 243 also is passed through refrigerant heat exchanger 219 to provide additional refrigeration to cool demethanizer column overhead 217. Warmed expanded refrigerant is withdrawn via line 245 for fuel or other uses.

Additional refrigeration can be provided to refrigerant heat exchanger 219 if required by a cold refrigerant such as ethylene via line 247, which may be provided by a closed-loop refrigeration system (not shown).

In this configuration of FIG. 2, both expanders 235 and 241 can be operated at the same or warmer inlet/outlet temperatures and as a result can provide more refrigeration than in the prior art method of FIG. 1. Condensed methane-rich liquid from the demethanizer column overhead in line 225 and the hydrogen-enriched stream in line 215 from dephlegmator heat exchanger 207 are reduced in pressure across valves 227 and 229 respectively and preferably are combined to reduce the partial pressure of methane in the resulting mixed stream in line 231. The methane can then be revaporized at a relatively high total pressure to provide all of the refrigeration required in dephlegmator heat exchanger 207.

For certain compositions of the dephlegmator overhead in line 215 and the demethanizer column overhead in line 217, it may not be advantageous to combine the two streams if the resulting mixed stream in line 231 does not result in a lower partial pressure of the primary vaporizing component(s) compared with the use of the demethanizer column overhead stream alone. The combined use of dephlegmator overhead from line 215 and cooled demethanizer column overhead from line 225 via line 231 as the process refrigerant stream to dephlegmator heat exchanger 207 is therefore optional. In certain cases, only cooled demethanizer column overhead from line 225, i.e., the primary refrigerant, would be used for refrigeration in dephlegmator heat exchanger 207.

Figure 3:
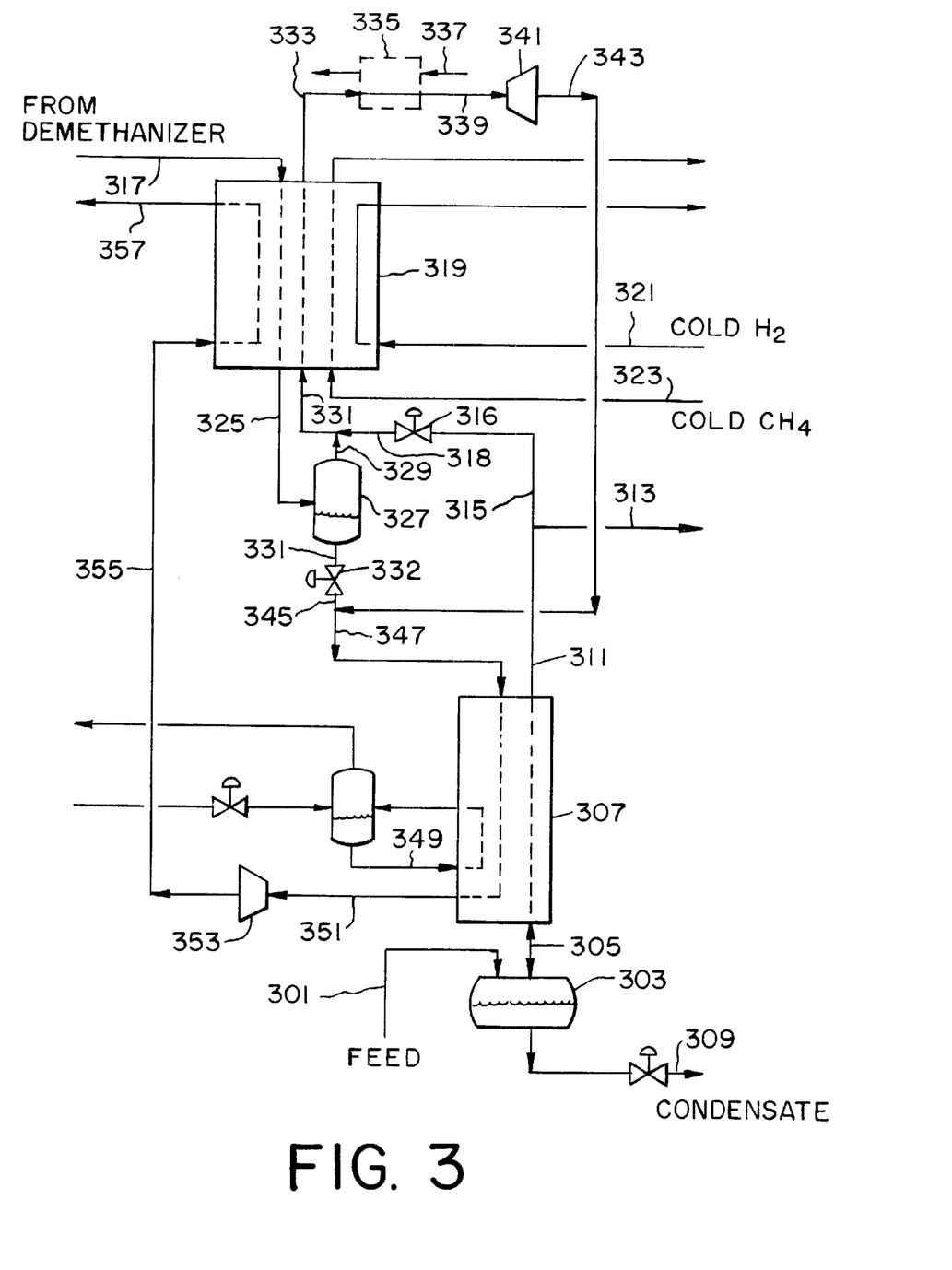
FIG. 3 is a schematic flow diagram of a dephlegmator heat exchanger system according to a not embodiment of the present invention.

An alternative embodiment of the invention is illustrated in FIG. 3. Feed gas 301 is introduced into dephlegmator drum 303 and uncondensed vapor flows upward through line 305 and into on e group of flow channels of dephlegmator heat exchanger 307, wherein the vapor is partially condensed and rectified. Condensate flows downward in mass and heat exchange with the upward-flowing vapor, thereby enriching the liquid in the heavier components and enriching the vapor on the lighter components. Condensate flows downward through line 305 into drum 303 and is withdrawn via line 309 as a liquid condensate enriched in ethylene. This ethylene-rich condensate is further separated by distillation in one or more demethanizer columns (not shown) to yield a purified ethylene product.

Cold vapor enriched in hydrogen and methane is withdrawn through line 311 and divided into two streams via lines 313 and 315. The first portion via line 313 is sent to a hydrogen recovery system (not shown). Overhead gas from the demethanizer column(s) via line 317 is cooled in refrigerant heat exchanger 319 at least in part by indirect heat exchange with cold hydrogen and methane streams in lines 321 and 323 respectively from the hydrogen recovery system (not shown). The demethanizer overhead gas in line 317 is the primary refrigerant in this embodiment. Cooled and partially condensed demethanizer column overhead in line 325, i.e., cooled and partially condensed primary refrigerant, is separated in separator 327 into vapor and liquid streams in lines 329 and 331 respectively.

Cold vapor in line 315 passes through flow control valve 316 and the resulting vapor in line 318 is combined with the vapor in line 329 to yield a combined stream in line 331. This combined stream is warmed in refrigerant exchanger 319 to provide additional refrigeration therein, and the warmed stream in line 333 optionally is further warmed in conventional heat exchanger 335 against a suitable process stream in line 337. Vapor in line 339 is work expanded in turboexpander 341 to an intermediate pressure to yield a cooled and optionally partially condensed stream in line 343. This stream is combined with condensed primary refrigerant demethanizer column overhead liquid in line 345 obtained by reducing the pressure of the liquid in line 331 across valve 332. The combined stream in line 347 is a process refrigerant stream which flows through dephlegmator heat exchanger 307 to provide most or all of the refrigeration required to cool and condense feed gas 301. Optionally, additional refrigeration can be provided to dephlegmator 307 by liquid ethylene or other low-boiling refrigerant from a closed-loop refrigeration system via line 349.

Warmed process refrigerant in line 351 is work expanded in turboexpander 353 to yield cooled refrigerant in line 355, which is introduced into refrigerant heat exchanger 319 to provide additional refrigeration therein. Warmed expanded refrigerant is withdrawn therefrom in line 357 for fuel or other uses.

The application of the refrigeration methods described above for FIGS. 2 and 3 to world-scale ethylene plants will require additional dephlegmators (not shown) in parallel with dephlegmator heat exchangers 207 or 307. As many as 4 to 8 dephlegmator heat exchangers in parallel could be required. If each of these were similar to dephlegmator heat exchanger 7 of FIG. 1, a very complex arrangement of piping and headers would be required to provide the necessary multiple refrigerant streams to the multiple parallel dephlegmator heat exchangers. This complexity can be reduced significantly by the method of the present invention in which a single primary refrigerant stream is obtained from multiple refrigerant streams by utilizing the heat exchange arrangements described above. This single primary refrigerant stream can then be divided among the parallel dephlegmators, each of which require only one refrigerant stream. In certain cases, the refrigeration provided by the primary refrigerant streams can be supplemented by an externally-obtained refrigerant such as ethylene or other low-boiling liquid from a closed-loop refrigeration system, or by a second primary refrigerant stream.

The process of the present invention is illustrated above for the recovery of ethylene from cracked gas obtained by hydrocarbon pyrolysis. The process also can be used for other feed gas mixtures such as, for example, natural gas comprising nitrogen, methane, ethane, and other light hydrocarbons or synthesis gas comprising hydrogen, carbon monoxide, a d methane. While the process illustrated above utilizes a dephlegmator or dephlegmator heat exchanger, the invention can be applied to other types of process heat exchangers as well.

In the present disclosure, the term "open-loop refrigerant" or "open-loop refrigerant stream" is defined to mean a cold fluid stream which is warmed to provide refrigeration by indirect heat exchange with a process stream which is cooled. An open-loop refrigerant by definition is utilized in the cooling process in a once-through mode in which the refrigerant stream is introduced into the cooling process, utilized for its refrigeration content, and withdrawn from the process as a warmed stream. An open-loop refrigerant by definition is not used in a closed-loop refrigeration system in which warmed refrigerant is compressed, cooled, expanded, and recycled to provide further refrigeration. In addition, an open-loop refrigerant by definition does not consist entirely of components direct y obtained from the process stream being cooled. The term "directly obtained" means obtaining a portion of the process stream itself or obtaining a portion of the process stream by subjecting the process stream to a single phase separation step.

According to this definition, streams in lines 217, 221, 223, 237, and 243 of FIG. 2 are open-loop refrigerants. Likewise, streams in lines 317, 321, 323, 331, and 355 of FIG. 3 are open-loop refrigerants. Conversely, streams in lines 201, 209, and 215 of FIG. 2, and in lines 301, 309, and 318 of FIG. 3, cannot be used as open-loop refrigerants according to this definition.

EXAMPLE

A specific example is given below for the method to provide refrigeration for multiple, parallel dephlegmators using a single primary refrigerant stream as shown in FIG. 2. A cracked gas stream of 6576 lbmoles per hour in line 201 with a composition of 35.7 mole % hydrogen, 0.4% carbon monoxide, 53.8% methane, 9.9% ethylene and 0.2% ethane, at °113° F. and 520 psia, is cooled to −170° F. and rectified in multiple, parallel dephlegmators. One of these dephlegmators is shown as dephlegmator heat exchanger 207 of FIG. 2; similar operation occurs in the other parallel dephlegmators (not shown). Condensed liquid at 1150 lbmoles per hour containing 1.4 mole % hydrogen, 0.1% carbon monoxide, 41.4% methane, 56.1% ethylene, and 1.0% ethane is separated in dephlegmator drum 203 and removed via line 209 for further processing. The uncondensed vapor at 5426 lbmoles per hour containing 43.0 mole % hydrogen, 0.5% carbon monoxide, 56.5% methane and 0.1% ethylene, at −170° F. is removed via line 211 and split into two portions. One portion, 3481 lbmoles per hour, is sent via line 213 to the hydrogen recovery section to be separated into a hydrogen-enriched product stream and a methane-enriched fuel stream. The other portion, 1945 lbmoles per hour in line 215, forms one part of process refrigerant stream 231 which provides refrigeration to dephlegmator heat exchanger 207.

The other part of process refrigerant stream 231 is provided by a primary refrigerant from the demethanizer column overhead condenser at 2025 lbmoles per hour via line 217. This primary refrigerant has a composition of 6.6 mole % hydrogen, 0.3% carbon monoxide, 92.9% methane and 0.2% ethylene, at −123° F. and 464 psia. The stream is cooled to −183° F. and is nearly totally condensed in refrigerant heat exchanger 219 to provide cooled primary refrigerant in line 225. The two refrigerant stream in lines 215 and 225 are flashed across valves 229 and 227 respectively, and after flashing are combined to yield the combined process refrigerant stream in line 231 at −178° F. and 435 psia. The combined process refrigerant stream at 3970 lbmoles per hour containing 24.4 mole % hydrogen, 0.4% carbon monoxide, 75.1% methane and 0.1% ethylene, is then warmed to −118 ° F. and vaporized in dephlegmator heat exchanger 207 to provide all of the required refrigeration therein. The warmed process refrigerant stream in line 233 is work expanded in turboexpander 235 to −181° F. and 187 psia, passes through line 237, and is further warmed to −149° F. in refrigerant heat exchanger 219. The further warmed refrigerant stream in line 239 is then further work expanded in turboexpander 241 to −204° F. and 79 psia, passes through line 243, and is warmed to −135° F. in refrigerant heat exchanger 219.

Additional refrigeration for refrigerant heat exchanger 219 also can be provided by warming the hydrogen product and methane fuel streams from the hydrogen recovery section via lines 221 and 223 respectively from −199° F. at the inlet to −135° F. at the outlet of refrigerant heat e changer 219. Supplemental refrigeration, about 10% of the total refrigeration required for the refrigerant exchanger 219, can be provided by −149° F. ethylene refrigerant in line 247.

In this example, both expanders 235 and 241 can be operated at the same or warmer inlet and out let temperatures, and therefore can provide more refrigeration than in the prior art method of FIG. 1. The condensed methane-rich liquid from the demethanizer column overhead via line 217 is combined with a portion of the hydrogen-enriched vapor stream from the dephlegmator overhead via line 215 to reduce the partial pressure of methane in the resulting mixed process refrigerant stream in line 231. This allows the methane to be revaporized at a relatively high total pressure to provide all of the required refrigeration in the dephlegmator 207.

The present invention provides a low-cost method to provide refrigeration from multiple refrigerant streams to multiple, parallel process heat exchangers including conventional heat exchangers and dephlegmator heat exchangers. World-scale ethylene plants, large-scale natural gas or synthesis gas processing plants, and other large process plants which utilize process heat exchangers for feed gas cooling typically require multiple, parallel process heat exchangers because of the large flow rates of the feed and refrigerant streams. The features of the present invention can be utilized in these plants to minimize the number of refrigerant streams to the parallel process heat exchangers, which in turn significantly reduces the associated manifolding and piping required to provide refrigeration.

This concept also can be used to increase the feed handling capacity and reduce the cost of multiple, parallel, conventional heat exchangers or dephlegmator heat exchangers by eliminating several refrigerant streams and the associated manifolding and piping from the parallel units. Elimination of several refrigerant streams from these heat exchangers will result in smaller and/or fewer heat exchangers and will eliminate much of the complex refrigerant piping and manifolding. In most cases, the total heat exchanger volume will be approximately the same as with the prior art methods, since only a single heat exchanger usually will be required to cool and condense the primary refrigerant stream. Therefore, most of the heat exchanger manifolding will be eliminated, with a significant savings in cost.

This method refrigerating multiple, parallel conventional heat exchangers or dephlegmator heat exchangers is much simpler than an open-loop or a closed-loop mixed refrigerant cycle, since it utilizes a primary refrigerant stream to transfer refrigeration from other refrigerant streams to the multiple, parallel heat exchangers. It does not require compression to circulate the refrigerant stream and it does not add additional large flow streams to the process, which would increase the size and cost of the heat exchangers.

This method of refrigerating multiple, parallel dephlegmators would be especially advantageous if the dephlegmators were installed in a pressure vessel. Only one or two refrigerant streams would be required for providing refrigeration to the dephlegmators. Therefore, the number of pipes penetrating the shell of the pressure vessel would be greatly reduced and most of the manifolding would be eliminated, with a corresponding reduction in cost. The refrigerant heat exchanger and associated refrigerant stream piping could be outside of the pressure vessel. Alternatively, the refrigerant heat exchanger could be installed inside the pressure vessel.

The essential characteristics of the present invention are described completely in the foregoing disclosure. One skilled in the art can understand the invention and make various modifications without departing from the basic spirit of the invention, and without deviating from the cope and equivalents of the claims which follow.

What is claimed is:

1. A method for cooling a process stream which comprises:

(a) obtaining a plurality of open-loop refrigerant streams (b) selecting one of the open-loop refrigerant streams as a primary refrigerant stream and cooling the primary refrigerant stream by indirect heat exchange with other of the open-loop refrigerant streams in a refrigerant heat exchanger to yield a cooled primary refrigerant stream; and (c) cooling the process stream by indirect heat exchange with a process refrigerant stream in a process heat exchanger to yield one or more cooled process streams and a warmed process refrigerant stream, wherein the process refrigerant stream comprises at least a portion of the cooled primary refrigerant stream.

2. The method of claim 1 which further comprises operating one or more additional process heat exchangers in parallel with the process heat exchanger of (c) wherein each of the additional process heat exchangers cools an additional process stream by indirect heat exchange with a portion of the process refrigerant stream.

3. The method of claim 2 wherein the process stream of (c) and the one or more additional process streams are gas mixtures which have identical compositions.

4. The method of claim 1 wherein the process heat exchanger is a dephlegmator heat exchanger which cools, partially condenses, and rectifies a mixed feed gas stream to produce a condense stream and a light overhead gas stream.

5. The method of claim 4 wherein a portion of the light overhead gas stream is combined with the cooled primary refrigerant to provide the process refrigerant stream of (b).

6. The method of claim 5 wherein the warmed process refrigerant stream of (c) is work expanded to yield an expanded cooled refrigerant stream which provides one of the other open-loop refrigerant streams in (b).

7. The method of claim 6 wherein the expanded cooled refrigerant stream is warmed to provide refrigeration in the refrigerant heat exchanger, a warmed expanded refrigerant stream is withdrawn therefrom, and the warmed expanded refrigerant stream is further work expanded to yield a further expanded cooled refrigerant stream which provides another of the other refrigerant streams in (b).

8. The method of claim 4 wherein the cooled primary refrigerant stream of (b) is a two-phase vapor-liquid primary refrigerant stream.

9. The method of claim 8 which further comprises
   (1) separating the two-phase vapor-liquid primary refrigerant stream into a vapor refrigerant stream and a liquid refrigerant stream;
   (2) combining the vapor refrigerant stream with a portion of the light overhead gas stream to yield a combined vapor refrigerant;
   (3) warming the combined vapor refrigerant in the refrigerant heat exchanger to provide refrigeration therein and yield a warmed combined vapor refrigerant;
   (4) work expanding the warmed combined vapor refrigerant to provide a cooled combined refrigerant; and
   (5) combining the cooled combined refrigerant with the liquid refrigerant stream of (1) to provide the process refrigerant stream of (c).

10. The method of claim 9 which further comprises withdrawing the warmed process refrigerant stream from the process heat exchanger and work expanding the warmed process refrigerant to provide one of the other open-loop refrigerant streams in (a).

11. The method of claim 4 wherein the process stream comprises hydrogen, methane, ethylene, and ethane.

12. The method of claim 11 wherein the light overhead gas stream comprises hydrogen and methane.

13. The method of claim 12 which further comprises separating a portion of the light overhead gas stream into a hydrogen-enriched product stream and a methane-enriched fuel stream, and utilizing the hydrogen-enriched product stream and the methane-enriched fuel stream to provide two of the other open-loop refrigerant streams of (a).

14. The method of claim 1 wherein the process heat exchanger is a conventional heat exchanger.

15. The method of claim 1 wherein the warmed process refrigerant stream of (c) is work expanded to yield an expanded cooled refrigerant stream which provides one of the other open-loop refrigerant streams in (b).

16. The method of claim 15 wherein the expanded cooled refrigerant stream is warmed to provide refrigeration the refrigerant heat exchanger, a warmed expanded refrigerant stream is withdrawn therefrom, and the warmed expanded refrigerant stream is further work expanded to yield a further expanded cooled refrigerant stream which provides another of the other open-loop refrigerant streams in (b).

17. The method of claim 1 wherein two of the plurality of open-loop refrigerant streams of (a) are combined to provide the primary refrigerant stream which is cooled by indirect heat exchange with the other open-loop refrigerant streams.

18. The method of claim 1 wherein the process stream comprises nitrogen, methane, and ethane.

19. The method of claim 1 wherein the process stream comprises hydrogen, carbon monoxide, and methane.

20. The method of claim 1 wherein additional refrigeration is provided to either or both of the refrigerant heat exchanger and the process heat exchanger by warming a refrigerant provided by a closed-loop refrigeration system.

21. A heat exchanger system for cooling a process stream which comprises:
   (a) refrigerant heat exchange means for providing indirect heat exchange among a plurality of open-loop refrigerant streams wherein one of the open-loop refrigerant steams is cooled by indirect heat exchange with other of the open-loop refrigerant streams to yield a cooled primary refrigerant stream and warmed refrigerant streams;
   (b) process heat exchange means for providing indirect heat exchange between at least the process stream and a process refrigerant stream to yield a cooled process stream and an additional warmed refrigerant stream, wherein the process refrigerant stream comprises at least a portion of the cooled primary refrigerant stream;
   (c) piping means for introducing the open-loop refrigerant streams into the refrigerant heat exchange means and for withdrawing the cooled primary refrigerant stream and warmed refrigerant streams from the refrigerant heat exchange means; and
   (d) piping means for introducing the process refrigerant stream into the process heat exchange means and for withdrawing the cooled process stream and the additional warmed refrigerant stream from the process heat exchange means.

* * * * *

UNITED STATES PATENT AND TRADEMARK OFFICE
CERTIFICATE OF CORRECTION

PATENT NO.    : 6,487,876 B2
DATED         : December 3, 2002
INVENTOR(S)   : Howard et al.

It is certified that error appears in the above-identified patent and that said Letters Patent is hereby corrected as shown below:

Column 12,
Line 31, delete "steams" and substitute therefor -- streams --.

Signed and Sealed this

Eighth Day of April, 2003

JAMES E. ROGAN
*Director of the United States Patent and Trademark Office*